United States Patent [19]

Poorman et al.

[11] Patent Number: 5,121,821
[45] Date of Patent: Jun. 16, 1992

[54] FLUID TORQUE CONVERTER AND FLEXPLATE COUPLING

[75] Inventors: James P. Poorman, Huber Heights; Robert A. Muchmore, Mason, both of Ohio

[73] Assignee: General Motors Corporation, Detroit, Mich.

[21] Appl. No.: 756,730

[22] Filed: Sep. 9, 1991

[51] Int. Cl.⁵ .............................................. F16D 33/00
[52] U.S. Cl. .................................. 192/3.28; 192/3.29; 464/68
[58] Field of Search ............... 192/3.28, 3.29, 3.33; 464/98, 68, 66; 60/338

[56] References Cited

U.S. PATENT DOCUMENTS

| | | | |
|---|---|---|---|
| 4,422,535 | 12/1983 | Ling | 192/3.38 |
| 4,510,747 | 4/1985 | Yoshida | 192/3.29 X |
| 4,777,843 | 10/1988 | Bopp | 192/3.21 X |
| 4,816,006 | 3/1989 | Friedman | 464/68 X |

Primary Examiner—Leslie A. Braun
Assistant Examiner—Andrea Pitts
Attorney, Agent, or Firm—Donald F. Scherer

[57] ABSTRACT

A coupling interconnecting an engine and the impeller of a torque converter in a vehicle powertrain has first and second inertia masses interconnected by a spring and friction isolator. The coupling is effective to decrease the inertia mass of the engine and to increase the inertia mass of the transmission thereby providing a change in the natural frequency of the vehicle powertrain.

2 Claims, 3 Drawing Sheets

FLUID TORQUE CONVERTER AND FLEXPLATE COUPLING

BACKGROUND OF THE INVENTION

This invention relates to vehicle powertrains, and more particularly, to powertrains having an engine, torque converter, a transmission and a coupling between the engine and torque converter.

Specifically, this invention relates to powertrain systems, wherein the coupling between the engine and torque converter is divided into two inertia mass components, one connected with the engine and the other connected with the cover and impeller of the torque converter, and also wherein a spring and friction isolator assembly is disposed to transmit power between the inertia masses while damping torsional vibrations.

Many of the current automotive automatic transmissions employ a selectively engageable friction clutch and isolator assembly to connect the torque converter impeller and torque converter turbine together thereby improving driveline efficiency. With these systems, clutch engagement at low engine speeds generally results in driveline disturbances which are perceived by the driver and therefore limit the engagement speed range.

In an attempt to lower the engine speed at which the clutch can be engaged without these disturbances occurring, some transmissions utilize a viscous slipping clutch disposed in series with the friction clutch. While this arrangement does permit lower engagement speeds, the cost of the system increases and some efficiency loss remains.

Dual mass flywheel systems have been proposed to reduce driveline disturbances in countershaft type transmissions with synchronizer shifting controls. In these powertrain systems, the engine and transmission are completely disconnected during ratio interchanges by a selectively engageable clutch member. While these systems do provide some improved driveline damping, they include an increased number of spring systems and/or friction interface connections to release the inertia load from the synchronizers during a ratio interchange. These systems can be very complex and more costly than conventional powertrains.

SUMMARY OF THE INVENTION

The present invention seeks to provide a driveline coupling between the engine and torque converter that will permit the friction clutch to be fully engaged at lower engine speeds while maintaining pleasability in the drive system. To accomplish this improvement, the inertia mass of the torque converter impeller, torque converter cover and the clutch is separated from the engine inertia mass and, along with a portion of the flywheel inertia, is added to the transmission inertia mass. By thus separating these inertias, the natural frequency of the system can be designed to a lower value thereby permitting engagement of the clutch at lower engine speeds. This also permits the removal of the isolator from the clutch for placement between the inertia masses.

It is therefore an object of this invention to provide an improved powertrain having an engine, torque converter and gear transmission drive connection, a coupling assembly is divided into two inertia masses drivingly interconnected by a spring and friction isolator, wherein one inertial mass is rotationally coupled with the engine and the other inertia mass is rotationally coupled with the impeller and cover of the torque converter and further wherein, a selectively engageable friction clutch is operable to connect the other friction mass and the torque converter impeller directly with the gear transmission.

It is another object of this invention to provide an improved coupling for a vehicle powertrain having an engine, a torque converter and gear transmission, wherein the coupling includes a spring isolator which is disposed to separate a pair of inertia masses, one of which is connected with the engine and the other of which is connected with the impeller of the torque converter and also wherein, a friction clutch is selectively operable to connect the other inertia mass and impeller to the gear transmission downstream of the spring isolator.

These and other objects and advantages of the present invention will be more readily apparent from the following description and drawings.

DESCRIPTION OF THE PREFERRED EMBODIMENT

Figure 1:
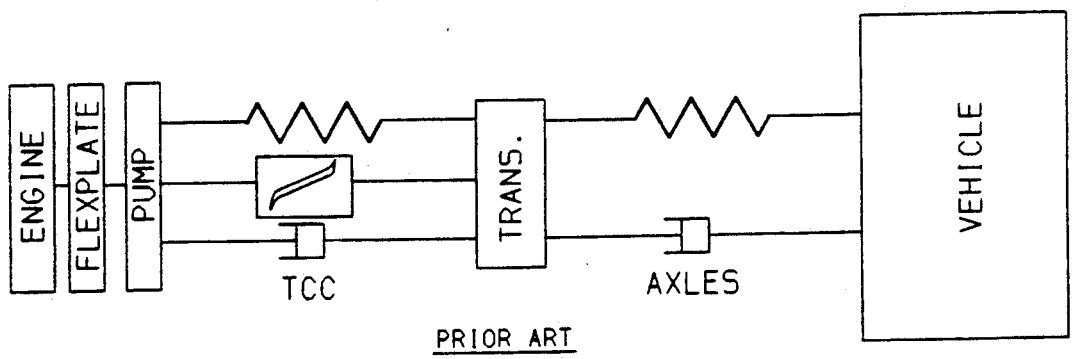
FIG. 1 is a diagrammatic representation of the inertia and spring system found in prior art front wheel drive vehicles utilizing automatic power transmissions.

The prior art system, shown in FIG. 1, has an engine, flexplate and torque converter pump or impeller connected on one side of a torque converter clutch and isolator, and a gear transmission connected to the other side of the torque converter clutch and isolator. The transmission is connected to the vehicle via a pair of axles which represent a spring and damper isolator connected with the vehicle inertia mass.

Figure 3:
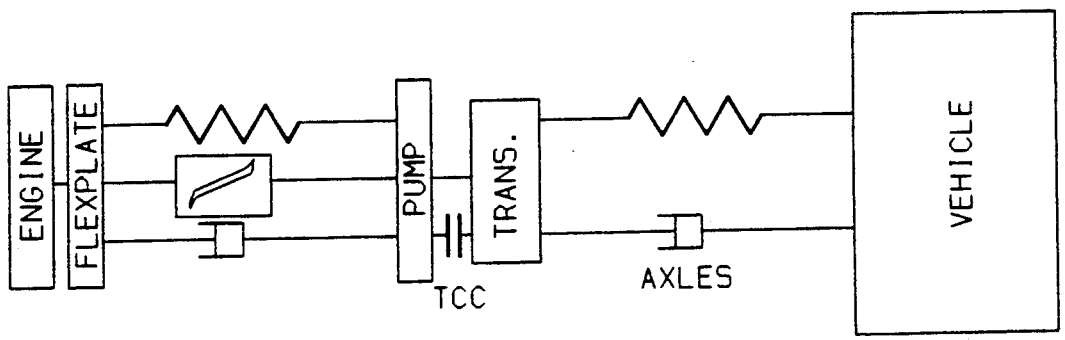
FIG. 3 is a diagrammatic representation of a front wheel drive vehicle powertrain incorporating the inertia mass distribution of the present invention.

In FIG. 3, it can be seen that the present invention is effective to separate the torque converter pump inertia from the engine and flexplate inertia. Also, it should be noted in FIG. 3 that the torque converter clutch has been disposed to connect the pump of the torque converter and the transmission gearing directly while the isolator remains effective between the flexplate and torque converter pump.

Figure 2A:
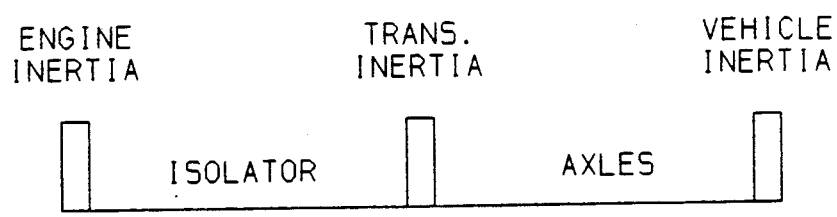
FIGS. 2a, 2b and 2c are Eigenvector representations of the response modes of a three degree of freedom model, such as that depicted in FIGS. 1 and 3.
Figure 2B:
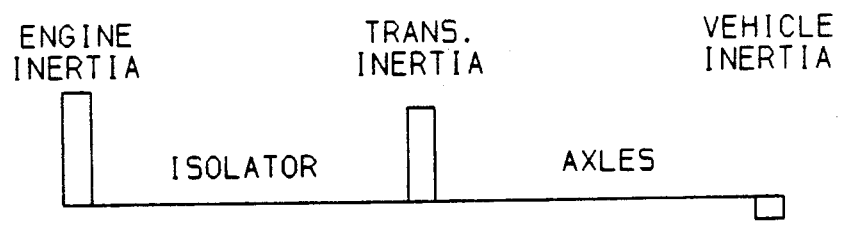
Figure 2C:
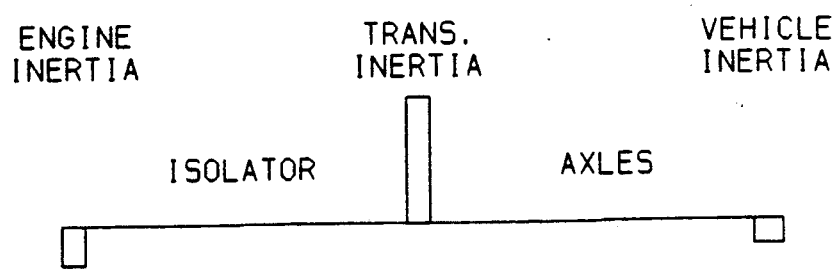

The Eigenvectors shown in FIGS. 2a, 2b and 2c represent three modes of operation or response in a three degree of freedom model as represented by the vehicle powertrains shown in FIGS. 1 and 3.

FIG. 2a represents an ideal case which is unlikely to occur in most vehicle powertrains. In FIG. 2a, the engine inertia, transmission inertia and vehicle inertia are seen to be in phase such that no relative motion occurs between these inertias. This will occur only if extremely stiff connections are formed between these three inertias. In reality, such stiffness is not readily available.

FIG. 2b represents the vehicle powertrain inertia, wherein the vehicle inertia is 90 degrees out of phase with the engine and transmission inertias. This will occur when the vehicle axles represent the dominant spring system within the vehicle's natural frequency mode. Another natural frequency mode can occur in the depiction of FIG. 2b wherein the isolator between the engine inertia and transmission inertia is controlling, in which case, the engine inertia would be out of phase with the transmission inertia and vehicle inertia. This frequency response represented in FIG. 2b quite often occurs when the operator has rapidly released the throttle during acceleration.

The dynamic response mode shown in FIG. 2c occurs when the transmission inertia is 90 degrees out of phase with the vehicle and engine inertias. This natural frequency node occurs at low engine speeds when the torque converter clutch is engaged and the engine transient torque spikes excite the system. This dynamic response mode is represented in terms of the torque converter spring rate and equivalent four cylinder engine rpm in FIG. 4.

Figure 4:
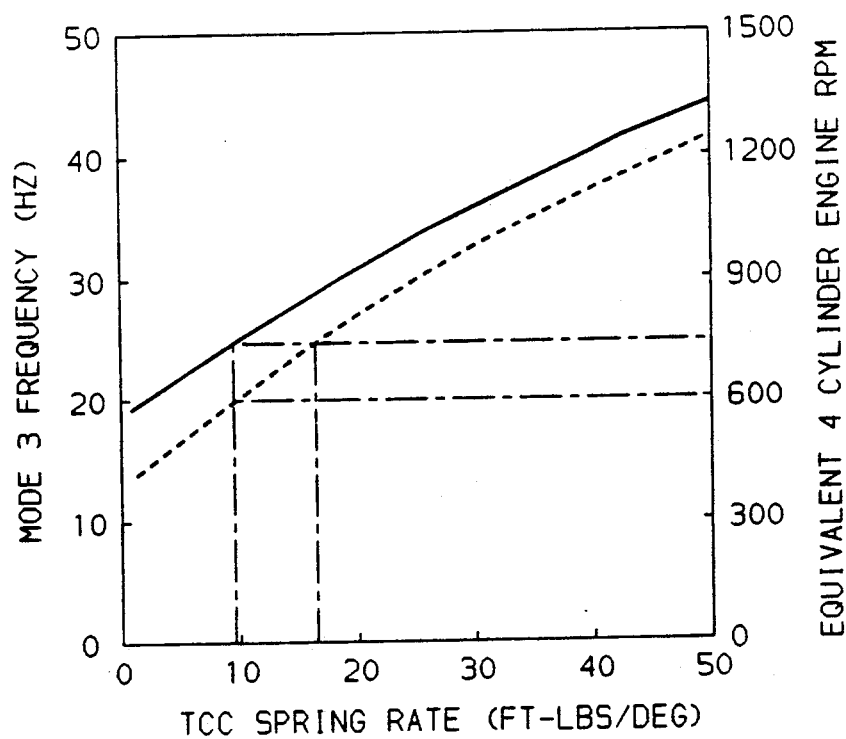
FIG. 4 is a chart depicting the effect of the inertia re-distribution shown in FIG. 3, relative to the inertia distribution shown in FIG. 1.

The representation in FIG. 4 also has an axis labeled Mode 3 Frequency which represents the natural frequency of the vehicle powertrain in relation to the isolator or torque converter clutch spring rate. The solid line shown in FIG. 4 represents the current automatic transmission vehicle powertrain vehicle design practice and the dash line represents the effect the present invention has on these systems.

Assuming a spring rate of ten foot pounds per degree, it is seen that the natural frequency of Mode 3 will occur at approximately 750 rpm. Thus, the torque converter clutch, in conventional systems, must remain disengaged at speeds at or below 750 rpm to prevent the vibrations which will occur in the vehicle powertrain. Using the same spring rate, it is seen that the present invention reduces the natural frequency equivalent to 600 rpm engine speed. This, of course, means that the torque converter clutch can be engaged at engine speeds at or above approximately 600 rpm. It is well known that the engagement of the torque converter clutch at lower engine speeds will result in improved fuel economy. Thus, some fuel economy gains are possible with the present invention.

Figure 5:
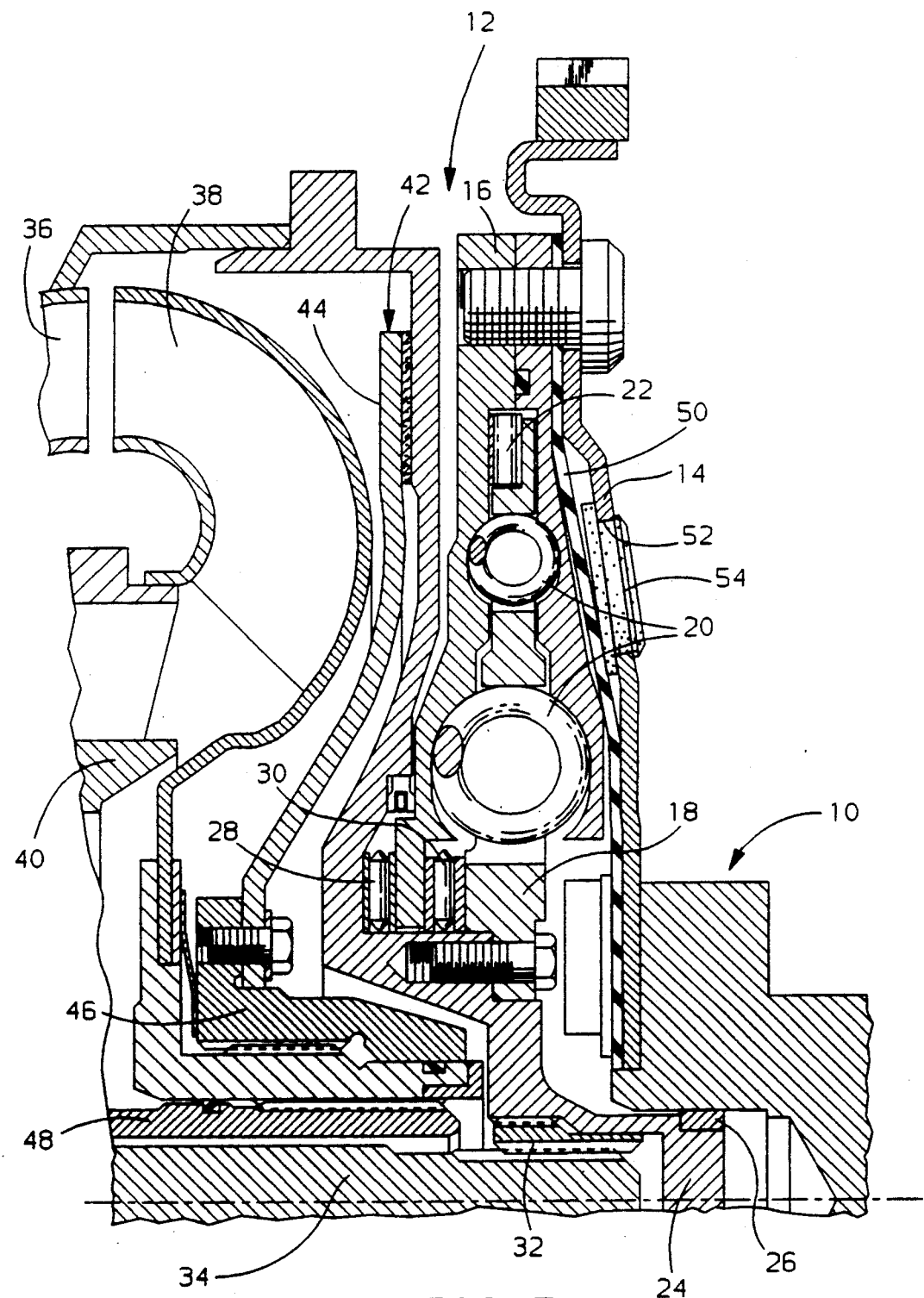
FIG. 5 is a cross-sectional elevational view of a portion of a vehicle powertrain showing an exemplary embodiment of the present invention.

FIG. 5 represents a portion of the vehicle powertrain incorporating the present invention. In FIG. 5, an engine crankshaft 10 is secured to a coupling 12 through a flexplate 14. The flexplate 14 will permit fore and aft movement between the coupling 12 and the engine crankshaft 10. The coupling 12 includes a two-piece housing or engine inertia mass 16, a transmission inertia mass 18, a plurality of isolator springs 20 and a hysteresis friction member 22. The inertia mass 18 is rotatably disposed between the two members of the engine inertia mass 16.

The hysteresis friction member 22 is preferably a wave spring which is frictionally engageable with the transmission inertia 18 and the engine inertia 16. The isolator springs 20 are disposed between the transmission inertia mass 18 and engine inertia mass 16 in a conventional manner. The isolator springs 20 will permit limited relative annular excursion between the transmission inertia mass 18 and the engine inertia mass 16 and will cooperate with the hysteresis friction member 22 to provide isolation between the torsional disturbances of the engine and the transmission inertia mass 16, 18, respectively.

The transmission inertia mass 18 is secured to a torque converter cover 24 which is rotatably supported in the engine crankshaft 10 by a bushing 26. A pair of needle roller bearings 28 and 30 are disposed between the torque converter cover 24 and the engine inertia mass 16 and the transmission inertia mass 18 and engine inertia mass 16, respectively, to accommodate the relative motion therebetween.

The torque converter cover 24 is drivingly connected through a spline connection 32 with a control pump driveshaft 34, which in turn is drivingly connected with a conventional positive displacement fluid pump, not shown. Such pumps are commonly used to provide hydraulic control fluid to operate the power transmission and to fill the fluid torque converter.

The torque converter cover 24 is secured to a torque converter impeller 36 which is disposed in toroidal flow relationship with a torque converter turbine 38 and torque converter stator 40. The impeller, turbine and stator cooperate to form a conventional torque converter, the operation of which is well known such that a further description of its structure and operation is not believed necessary.

The torque converter will permit slippage between the engine input and the turbine output which effectively dampens torsional vibrations and permits torque multiplication during the converter phase. These are the primary purposes for using a torque converter in that the device will permit smooth vehicle deceleration while maintaining the engine at the most appropriate torque output level. The drawback of a torque converter is, of course, that during the coupling phase, slippage between the impeller 36 and turbine 38 is an efficiency loss and therefore affects vehicle fuel economy.

In order to improve the vehicle fuel economy, a torque converter clutch 42 is disposed between the turbine 38 and the cover 24. The torque converter clutch includes an apply piston 44 and a hub 46 which is connected via a spline to the turbine 38. By selectively controlling the flow of fluid through the torque converter, the apply piston 44 can be forced to frictionally engage the torque converter cover 24 thereby eliminating the speed differential or slippage between the impeller 36 and the turbine 38. The turbine 38 is drivingly connected to a turbine shaft 48 which is coupled in a well known manner with a conventional planetary gear transmission, not shown.

When the torque converter clutch 42 is engaged, the torsional vibrations present at engine crankshaft caused by firing frequency, can be transmitted to the shaft 48. The isolator springs 20 and hysteresis friction member 22 are operable to significantly reduce or eliminate the transmission of transient torque spikes imposed on the engine crankshaft.

In prior art devices, the spring isolator and friction system is disposed in the torque converter clutch between the apply piston and the turbine. In these systems, the inertia of the torque converter cover 24 and torque converter impeller 36 are additive with the engine inertia while the torque converter turbine inertia is additive to the planetary gear transmission. As previously explained, this controls the Mode 3 natural frequency of the system.

With the present invention shown in FIG. 5, the isolator springs 20 separate the engine inertia mass 16 from the transmission inertia mass 18 such that the torque converter impeller 36, torque converter cover 24 and transmission inertia mass 18 are added to the inertia mass of the turbine 38 and the gear transmission, not shown, when the clutch 42 is engaged. This effectively reduces the natural frequency of the vehicle powertrain for any given engine rpm and spring rate of the isolator springs 20.

The coupling 12 is open to the fluid within a transmission and torque converter such that cooling and lubrication of the various components can be accomplished. In order to prevent the fluid from leaking to atmosphere through the flexplate 14, a bladder 50 is disposed between the flexplate 14 and the engine inertia mass 16. In order to properly control the axial flex rate of the flexplate 14, a plurality of openings, such as 52, are formed therein.

To prevent the bladder 50 from being damaged by encountering the edges of the openings 52, an elastomeric grommet 54 is secured in each of the openings 52. It has been found that these grommets will remain in position during flexing of the flexplate 14 as they are contacted by the bladder 50 and will effectively prevent the bladder 50 from being damaged by the edges of the openings 52.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A driveline having an engine, a vehicle drive axle and a power transmission interconnecting the engine and drive axle comprising: a fluid torque converter having an impeller and turbine, a flexplate coupling interconnecting said engine with said transmission having a first inertia mass continuously rotatable with said engine, a second inertia mass continuously rotatable with said impeller, isolator means disposed between said first and second inertia masses for permitting relative oscillatory movement therebetween, and selectively engageable friction clutch means for connecting said turbine, said impeller and said second inertia mass for unitary rotation.

2. A driveline having an engine, a vehicle drive axle and a power transmission interconnecting the engine and drive axle comprising: a fluid torque converter having an impeller and turbine, a flexplate coupling interconnecting said engine with said transmission having a first inertia mass continuously rotatable with said engine and defining a housing member, a second inertia mass continuously rotatable with said impeller and rotatably disposed within said housing member, isolator means including spring means and friction means disposed between said first and second inertia masses for permitting damped relative oscillatory movement therebetween, selectively engageable friction clutch means for connecting said turbine, said impeller and said second inertia mass for unitary rotation, and a bladder seal secured to said flexplate adjacent said housing member preventing fluid therein from leaking to atmosphere.

* * * * *